United States Patent [19]
Chenausky et al.

[11] 3,921,096
[45] Nov. 18, 1975

[54] UNSTABLE SPLIT MODE LASER RESONATOR

[75] Inventors: Peter P. Chenausky; Anthony J. DeMaria, both of West Hartford; David W. Fradin, Manchester; Robert J. Freiberg, South Windsor, all of Conn.

[73] Assignee: United Technologies Corporation, Hartford, Conn.

[22] Filed: Dec. 16, 1974

[21] Appl. No.: 533,376

[52] U.S. Cl............................................ 331/94.5 C
[51] Int. Cl.²......................................... H01B 3/081
[58] Field of Search.................................... 331/94.5

[56] References Cited
UNITED STATES PATENTS

| 3,611,181 | 10/1971 | Lary et al......................... | 331/94.5 C |
| 3,824,487 | 7/1974 | Buczek et al. ................... | 331/94.5 C |
| 3,873,942 | 3/1975 | Reilly............................. | 331/94.5 C |

Primary Examiner—William L. Sikes
Attorney, Agent, or Firm—Anthony J. Criso

[57] ABSTRACT

An unstable laser resonator system which provides an output beam with enhanced power, energy distribution and optical characteristics is disclosed. Two separate regions of gain medium each of which has the maximum dimensions permitted by the physical constraints of superfluorescent and excited population decay characteristics resonate in a split mode optical cavity having a common interlocked region of resonance which incorporates the contributions of each gain medium and combines the composite intracavity mode prior to output coupling from the resonator. The resonator system produces a coherent, phase-locked, high power, symmetric output beam. Optical cavities based on both spherical and cylindrical optics are discussed.

6 Claims, 5 Drawing Figures

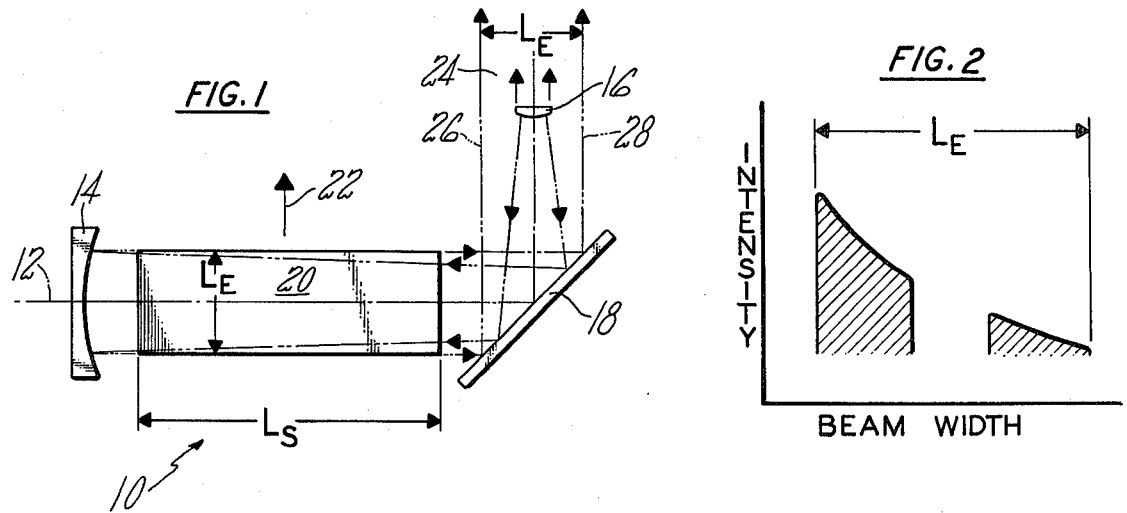
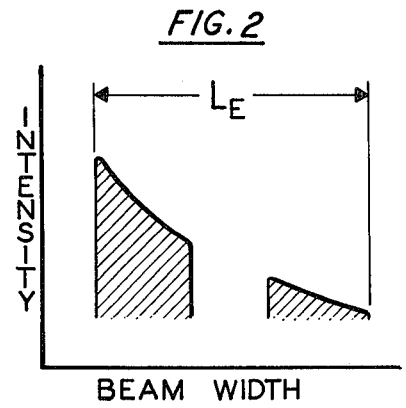
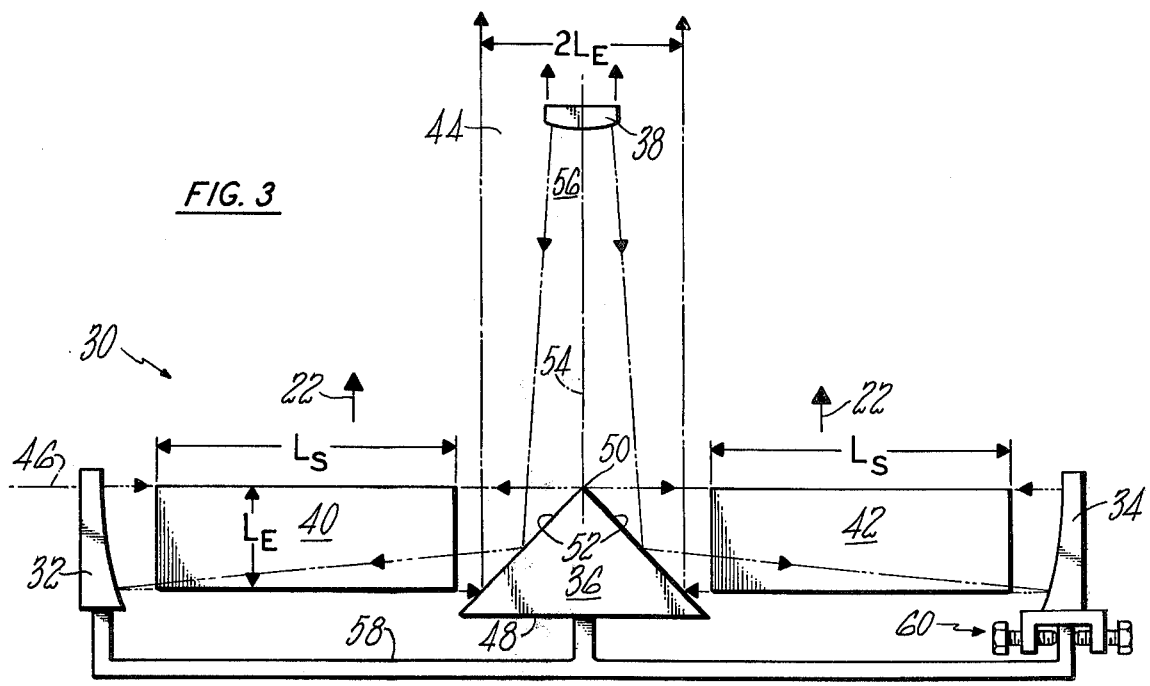
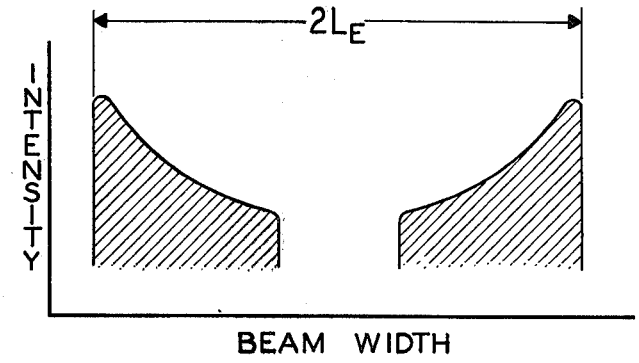

UNSTABLE SPLIT MODE LASER RESONATOR

BACKGROUND OF THE INVENTION

1. Field of Invention

The present invention relates to laser resonators and more particularly to an unstable resonator concept having two separate but cooperating regions of gain medium.

2. Description of the Prior Art

In the overall effort to increase the power extracted from laser devices, one of the first parameters which is extended to its physical limit is the volume of the working gain medium. Various interesting techniques have been developed to increase the volume of the working gain medium to the point where in particular geometric configurations the single pass gain is sufficiently high that unintended and difficult to control phenomena occur to the detriment of the system output. These spurious effects include superfluorescent and parasitic oscillations which can occur in the resonator. Various techniques have been examined and developed in the effort to minimize such effects and have met with various degrees of success. One of the more common solutions is to limit the maximum dimension of the active gain volume which occurs in any direction through the gain medium to suppress the particular tendency toward superfluorescence. In addition to this fundamental limitation to the working medium configuration, the avoidance of sharp edges, the coating of system components with nonreflective paint and distribution of the gain medium in as uniform a manner as is feasible have been found helpful, however, all such techniques can be categorized as attempts to maximize the output extractable from a gain medium which is limited in any direction by a length determined by the superfluorescent characteristics of the medium.

SUMMARY OF THE INVENTION

An object of the primary invention is to increase the volume of a given gain medium which can be utilized in an unstable resonator without incurring the limitations imposed by superradiant effects.

According to the present invention, an unstable resonator geometry having two separate gain regions allows a total volume of gain medium to resonate in a controlled manner such that stimulated emission from one gain medium is unable to propagate directly into the other gain medium and allow the resonator system to provide a single coherent output beam which is representative of the optical and gain medium characteristics of the total system.

A primary feature of the present invention is the existence of two separate gain regions in an unstable resonator configuration. The laser energy extracted from the resonator is in a symmetric mode having a transverse dimension which exceeds the transverse dimension of the gain medium. In addition, the resonator system is formed between a single curved output coupling mirror and two curved end mirrors having curvatures identical to each other. Further, the geometric center of the gain region is displaced significantly from the optical axis of the resonant cavities. Another feature of the invention is a reflector located midway between the two curved end mirrors and having two flat surfaces which are symmetric about an axis therethrough, the reflector being positioned to cooperate with both the output coupling and curved mirrors. Also, the radiation from each of the two gain regions is diffractively cross coupled resulting in a single, coherent, intracavity beam.

An advantage of the present invention is that the multiple regions of gain medium allow essentially twice the volume of active medium to be employed in the resonator system as compared with the maximum useful volume of gain medium in a conventional resonator. Thus, twice as much laser energy is theoretically available before the resonator operation is affected by such phenomena as superfluorescent and parasitic oscillations and the aspect ratio of the output beam can be reduced by a factor of two. Also, the variations in phase and intensity which occur to the modes circulating in the resonator due to the particular characteristics of the gain medium are symmetrized about a common axis in the near field output, resulting in an improved far field beam quality and reduced beam steering. In addition, the resonant modes from each of the gain regions interact within the resonator to establish spatial coherence within the intracavity mode and adjust to phase-locked operation. Further, this resonator system provides an output beam having a width in the near field which is essentially twice the extraction length of the active medium, resulting in a reduction in the far field angular divergence of the beam.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 1 is a simplified schematic showing an elevation view of a high aspect ratio unstable resonator employing folded path optics;

FIG. 2 is a sketch of the intensity profile of a typical output beam provided by an unstable resonator such as is shown in FIG. 1;

FIG. 3 is a simplified schematic showing an elevation view of a split mode unstable resonator in accordance with the present invention;

FIG. 5 is a simplified sketch of the intensity profile of the output beam which is typically produced with a split mode unstable resonator such as is shown in FIG. 3 and FIG. 4.

DESCRIPTION OF THE PREFERRED EMBODIMENT

Figure 4:
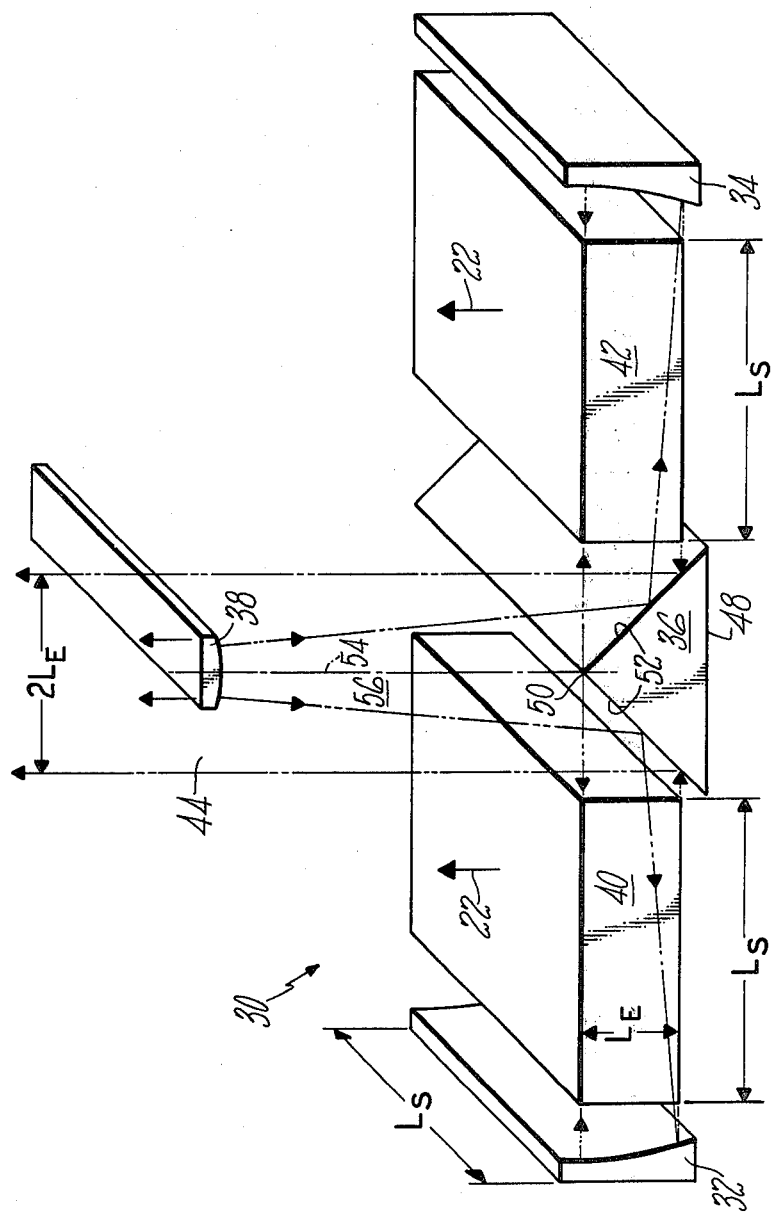
FIG. 4 is a simplified perspective sketch of the unstable resonator shown in FIG. 3.

This invention doubles the amount of gain medium which can be controlled effectively in an unstable resonator and is especially useful with high gain media which have extremely short deactivation rates such as those in combustion driven chemical lasers, particularly the high gain hydrogen fluoride and deuterium fluoride systems.

An unstable resonator 10 having a folded optical path about an optical axis 12 and designed to accommodate a maximum volume of gain medium without incurring superfluorescence is shown schematically in FIG. 1. The resonator is formed between a concave mirror 14 and a convex mirror 16, and a turning mirror 18 having a flat reflective surface which allows the curved mirrors to communicate optically with each other. A gain medium area 20 is shown between the concave and the flat mirrors with a superfluorescent length $L_S$ defined herein to be the maximum length of single pass gain for which the coherent radiation extracted from the gain medium is controlled by the resonator design and an extraction length $L_E$ defined herein to be the linear distance measured in the direction of flow over which power can be extracted before the excited population of the gain medium is substantially reduced. A straight line path through the gain medium in excess of $L_S$ leads to spurious operation which is independent of the resonator design. The area 20 is symmetric with respect to the optical axis 12. Working medium is flowed through the resonator in a direction 22 and when operating the resonator provides an output beam 24 having an upstream side 26 and a downstream side 28. The beam width in the near field is equal to the extraction length dimension of the gain medium. A typical intensity profile in the near field for such a beam is shown in FIG. 2; the scale is not the same in FIGS. 1 and 2. The profile usually appears as a sugar scoop because of the dynamics of the flowing gain medium. High gain lasers which are limited by the superfluorescence phenomenon often are characterized by a gain medium which has an extremely short vibrational deactivation time during which the population inversion lasts. This time is so short that even at the highest practical rates at which the gain medium can be flowed through the optical cavity, a substantial portion of the population inversion is depleted as the gain medium traverses from its initial point which may be a nozzle exit plane to its point of exit from the active optical region, a distance $L_E$. Consequently, less energy is contained in the beam from the downstream side of the cavity than in the beam from the upstream side. The absence of energy in the center of the profile is due to the presence of the convex mirror in the output beam 24.

A split mode unstable resonator system 30 which is designed to accommodate a maximum volume of gain medium without incurring superfluorescence and has components which are directly comparable to those of the resonator shown in FIG. 1 is shown schematically in FIG. 3. The system includes a left end mirror 32, a right end mirror 34, a center mirror 36 and a coupling mirror 38. The width of the coupling mirror 38 is twice the width of the convex mirror 16. The total volume of active medium is made up of a left gain medium region 40 which is formed between the left end mirror and the center mirror and a right gain medium region 42 which is formed between the right end mirror and the center mirror. The end mirrors 32, 34 and the concave mirror 14 all have the same radius of curvature and each of these three mirrors has the same surface area subject to optical flux or the resonant mode pattern. While the axis of symmetry for the concave mirror 14 is the optical axis 12 which passes through the geometric center of the gain region 20, the axis of symmetry for the end mirrors 32, 34 is a common axis line 46 which coincides with the upper edge of the left and right gain regions 40, 42 in the split mode resonator. The common axis line 46 is displaced upward from the geometric center of the gain regions by a distance equal to one half the extraction length dimension. The resonator system 36 provides a system output beam 44 having a width equal to twice the extraction length dimension characteristic of the gain medium regions 40, 42. The superfluorescent length and the extraction length are the same for both resonators. A typical intensity profile in the near field for the system output beam 44 is shown in FIG. 5. Although the scale is not the same in FIGS. 3 and 4, the same proportions are maintained between FIGS. 1 and 3 and between FIGS. 2 and 5.

The center mirror 36 has a cross section which is an isosceles triangle having a base 48, an apex 50 and for the embodiment shown in FIG. 3 an included angle 52 of ninety degrees. For the general case, a line through the center of each of the two gain regions forms an angle which in FIG. 3 is measured anticlockwise from one such line to the other; this angle is always exactly twice the included angle 52 of the center mirror. In the resonator system, the center mirror is positioned beneath the coupling mirror 38 which has either a convex or a concave reflection surface. If the mirror is concave, an intracavity focal point results. The coupling mirror is aligned so that a line perpendicular to the base and passing through the apex also passes through the center of the coupling mirror; such a line forms an axis of optical symmetry 54 in the system output beam 44. The apex is theoretically at the point where the common axis line 46 and the axis of optical symmetry intersects. An interlocked resonant mode region 56 is formed about the axis of optical symmetry 54.

In the operation of this resonator system a working fluid such as gas is flowed through the gain medium regions and each of the end mirrors cooperates with the coupling mirror to set up a resonant mode through their respective gain region. While the mode from each side of the resonator system can be independent of the other due to either intentional or poor design, operation according to the present invention requires that the mode on both sides be nearly identical and interlocked by diffractive cross coupling within the interlocked region 56. This consideration is critical to the present invention. Proper mode interlocking is accomplished by the inherent diffractive cross coupling between the modes provided the length, L, of the interlocked region 56 is sufficiently long that the parameter $a^2/L$ is less than unity, $a$ being the radius of the mode in the interlocked region, and provided also the relative separation distance between each of the end mirrors and the center mirror is closely controlled. Therefore, at least one of the end mirrors must be made adjustable to allow compensation for any dissimilarities in the effective optical length of each side of the resonator which affects the ability of the resonator system to lock the phases of the mode from each half. A representative means for providing such adjustability is a truss 58 which rigidly interconnects the end mirror 32 to the middle mirror 36 and attaches to the end mirror 34 with an adjustment means 60 such as is shown in FIG. 3. The adjustment can be accomplished passively or by means of an active servo system. Further, in order to maintain this interlocking, the end mirrors must have identically curved reflecting surfaces and be positioned precisely with respect to the common axis line 46.

The displacement of the geometric center of the gain regions from the common axis line 46 by a distance of one half the extraction length which is apparent in FIG. 3 is a manifestation of the split mode resonator concept. The optical axis 12 in FIG. 1 and the common axis line 46 in FIG. 3 are each perpendicular to the surfaces of the concave mirror 14 and the end mirrors 32, 34 respectively. The optical axis 12 intercepts the concave mirror at its midpoint and passes through the center of the gain medium whereas in the split mode embodiment, the common axis which is perpendicular to the surface of each end mirror at the point of intersection, passes along the top edge of the gain medium. The point at which the common axis intersects each end mirror corresponds to the intersection of the optical axis 12 on the concave mirror so that the left and right hand end mirrors of the split mode resonator correspond to the upper and lower sections of the concave mirror in the simple folded path resonator of FIG. 1. Although the split mode resonator is not necessarily configured as shown in FIG. 3, that is with an included angle 52 of ninety degrees, in any embodiment the split mode geometry is analogous to an unfolding of the simple resonator geometry. Since no circular mode exists above the common axis line the entire volume of each active gain region is below the same line. Each half of the resonator of FIG. 3 can accommodate the same volume of active medium before superfluorescence becomes dominant as the simple resonator and for comparable extraction efficiency, twice as much laser power is therefore possible with the split mode system. The extraction length limits the transverse extent of any single gain medium region and since the transverse extent of each half of the split resonator is equivalent to the full extent in the simple resonator, the transverse dimension of the system output beam 44 is twice as large as the output beam 24 as is apparent from comparing these parameters in FIGS. 1 and 3.

The angular divergence of the beam propagated by these resonators is inversely dependent upon the beam width and therefore the angle of divergence for the split resonator is typically one-half the angular divergence of the folded resonator, a generally desired characteristic of practical laser resonators since it results in a more localized far field energy distribution.

Both the left and the right hand gain regions 40, 42 contain an identical volume of gain medium which is characterized by identical physical characteristics. In the interlocked resonant mode region 56 the intracavity mode from each side of the split resonator is combined in a symmetrical fashion such that phase and intensity profile of the system output beam in the near field are symmetric about the axis of propagation. Further, as long as the resonator is properly aligned as discussed previously, the mode contribution from each of the two contributing regions of the split resonator are locked together in the interlocked region 56 in both frequency and phase coherence by the strong diffractive cross coupling which occurs in this region. Such phase coherence as well as the symmetrization of the phase and intensity profile of the system output beam in the near field are significant because they minimize steering of the system output beam with respect to the axis of propagation and result in a symmetric far field energy distribution in which the fractional energy content is maximized in the central region of the far field pattern, a highly desirable result in high power laser devices.

Most of the discussion and references to the drawing are in terms of a practical and useful resonator based on optics which are spherical. However, the resonator designs which provide the highest amount of power in the system output beam are based on cylindrical optics such as those shown in FIG. 4. Also, for the purposes of clarity in the sketches, the superfluorescent length is shown as the longer dimension in the cross section through the rectangular gain volume which in the FIGURES is parallel to the optical axis although to be precise this length is the diagonal through the area in the two dimensional sketch.

Although this invention has been shown and described with respect to preferred embodiments thereof, it should be understood by those skilled in the art that these and various other changes and omissions in the form and details thereof may be made therein without departing from the spirit and scope of the invention.

Having thus described a typical embodiment of our invention, that which we claim as new and desire to secure by Letters Patent of the United States is:

1. In an unstable resonator configuration having an axis of optical symmetry which passes through an interlocked resonant mode region and including a plurality of gain regions symmetrically disposed about the axis of symmetry, the combination comprising:
    an output coupling mirror having a curved reflective surface and positioned symmetrically about the axis of optical symmetry;
    a first gain medium region having a first longitudinal axis nonparallel to the axis of optical symmetry;
    a first end mirror including a first reflective surface having a center of curvature along a first axis which intersects, and at the point of intersection is perpendicular to, the first reflective surface, the first end mirror being positioned at one end of the first gain medium and being intersected by the first axis;
    a second gain medium having a second longitudinal axis nonparallel to the axis of optical symmetry;
    a second end mirror including a second reflective surface having a center of curvature along a second axis which intersects, and at the point of intersection is perpendicular to, the second reflective surface, the second end mirror being positioned at one end of the second gain medium and being intersected by the second axis; and
    a center mirror having a first and a second flat reflective surface which intersect to form a line of intersection and are symmetrically disposed about the axis of optical symmetry and oriented to allow the first end mirror and the coupling mirror to form a first resonant cavity which includes the first gain region and the second end mirror and the coupling mirror to form a second resonant cavity which include the second gain region wherein the first and second resonant cavities include the interlocked resonant mode region.

2. The invention according to claim 1 wherein the end reflective surfaces of the first and second end mirrors are curved concavely with respect to the center mirror.

3. The invention according to claim 2 wherein the reflective surface of the output coupling mirror is curved convexly with respect to the center mirror.

4. The invention according to claim 1 including further means for adjusting the separation distance between the first or the second end mirror and the center mirror.

5. The invention according to claim 4 wherein the reflective surfaces of the output coupling mirror and the first and second end mirrors are cylindrical in curvature.

6. The invention according to claim 1 wherein the first axis and the second axis intersect at the line of intersection.

* * * * *